United States Patent
Akamatsu et al.

[11] Patent Number: 4,893,387
[45] Date of Patent: Jan. 16, 1990

[54] ROLLER ELEMENTS FOR ROLLER BEARING

[75] Inventors: Yoshinobu Akamatsu, Kuwana; Morikatu Kotani, Iwata; Toshihide Goto, Morimachi; Kenji Hibi, Gifu; Toshihiko Matsushima, Iwata, all of Japan

[73] Assignee: NTN Toyo Bearing Co., Ltd., Osaka, Japan

[21] Appl. No.: 315,876

[22] Filed: Feb. 27, 1989

[30] Foreign Application Priority Data

May 30, 1988 [JP] Japan .................. 63-133794
Sep. 20, 1988 [JP] Japan .................. 63-235732

[51] Int. Cl.⁴ .................................. B21B 31/07
[52] U.S. Cl. .................... 29/121.1; 29/148.4 D; 29/148.4 A; 384/491; 384/450; 384/565
[58] Field of Search ............ 29/148.4 A, 148.4 B, 29/148.4 C, 148.4 D, 724, 121.1, 116.1, 121.8, 724; 384/450, 491, 565

[56] References Cited

U.S. PATENT DOCUMENTS

| | | | |
|---|---|---|---|
| 2,623,796 | 12/1952 | Frenkel | 384/450 |
| 2,631,904 | 3/1953 | Frenkel | 384/450 |
| 4,227,754 | 10/1980 | Kellström | 384/450 |
| 4,334,721 | 6/1982 | Satoh et al. | 384/450 |
| 4,345,800 | 8/1982 | Hofmann et al. | 384/450 |
| 4,705,411 | 11/1987 | Kellstrom | 384/450 |

FOREIGN PATENT DOCUMENTS

| | | | |
|---|---|---|---|
| 03319 | 1/1981 | Japan | 384/450 |
| 1247012 | 9/1971 | United Kingdom | 384/450 |

OTHER PUBLICATIONS

"Quality and productivity through surface measurement" Rank Taylor Hobson Limited, England, 1986.

Primary Examiner—Timothy V. Eley
Assistant Examiner—Peter Vo
Attorney, Agent, or Firm—Armstrong, Nikaido, Marmelstein, Kubovcik & Murray

[57] ABSTRACT

A roller element for use in a roller bearing having a surface formed with minute recesses at random so that the ratio RMS(L)/RMS(C) will be not more than 0.8 wherein RMS(L) is the roughness mean square value in the longitudinal direction and RMS(C) is the roughness mean square value in the circumferential direction and so that the SK value is not more than −0.2 in both the longitudinal and circumferential directions.

1 Claim, 7 Drawing Sheets

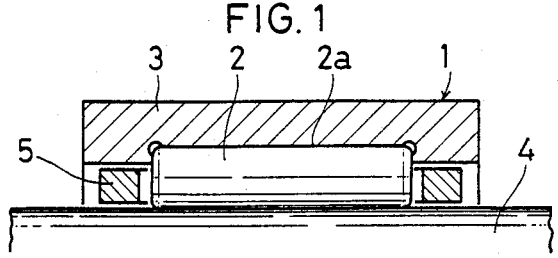
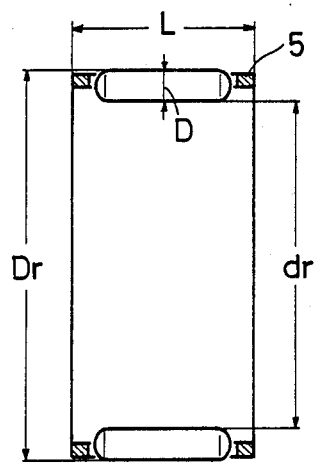
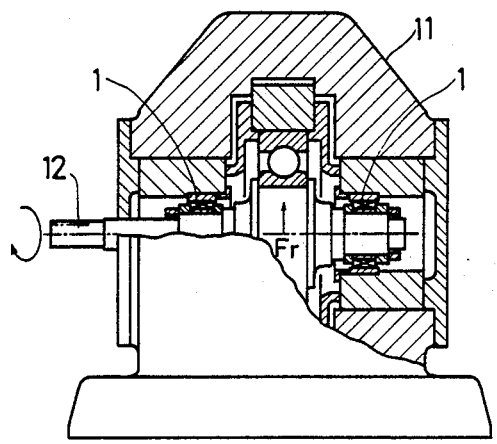

SURFACE ROUGHNESS IN THE LONGITUDINAL DIRECTION

SURFACE ROUGHNESS IN THE CIRCUMFERENTIAL DIRECTION

ROLLER ELEMENTS FOR ROLLER BEARING

FIELD OF THE INVENTION

The present invention relates to a roller element for a roller bearing, more specifically to a roller element which exhibits a long life irrespective of whether the mating surface is a rough surface or a well-finished smooth surface.

It is well-known that surface roughness is one of the important factors affecting the rolling fatigue life of a roller element for a roller bearing. It has heretofore been believed that the smoother the finished rolling surface, the longer the roller fatigue life of the roller element. The present inventors have discovered, after repeated trials and errors, that a roller element does not necessarily have to have a smooth and well-finished surface for long life and have discovered that a roller element having as a roller surface, a rough surface with scratches extending in random directions and having a maximum roughness of 0.3–0.8 micron has a rather long life. However, if the mating surface to such rough roller surface is a well-finished surface, an oil film layer is difficult to form at the interface between the surfaces. This causes the mating, well-finished surface to wear or peel. Thus, such roller element having a rough surface cannot be used with a shaft having a well-finished contact surface.

SUMMARY OF THE INVENTION

It is an object of the present invention to provide a roller element for a roller bearing having a surface which allows an oil film layer to be formed easily between surfaces and which exhibits a long life when used in contact with either a rough surface or a smooth surface.

The roller element according to the present invention has its surface formed with a multiplicity of randomly formed minute recesses. The roughness mean square values in the longitudinal and circumferential directions of the roller element (hereinafter abbreviated to RMS (L) and RMS (C), respectively) are determined so that the ratio RMS(L)/RMS(C) will be not more than 0.8 with the SK values below −2.0 both in the longitudinal and circumferential directions. The oil film ratio, which in the ratio of an oil film layer formed on the contact surface between two roller objects, increases and the mating surface is kept free from peeling and wear irrespective of its surface roughness. Thus, its life is long.

Other features and objects of the present invention will become apparent from the following description taken with reference to the accompanying drawings, in which:

BRIEF DESCRIPTION OF THE DRAWINGS

FIG. 1 is a sectional view of a needle bearing as the first example of a rolling bearing;

FIG. 2 is a sectional view of a needle bearing used for the life test;

FIG. 4 is a schematic view of a testing device;

DESCRIPTION OF THE PREFERRED EMBODIMENTS

Figure 3A:
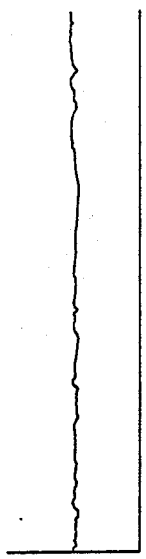
FIG. 3 are graphs showing the surface conditions of the roller elements tested.

FIG. 1 shows a roller bearing 1 in the form of a needle bearing in which cylindrical roller elements 2 are mounted in an outer ring 3 to support a shaft 4 in contact therewith.

The surface of rolling contact surface 2a of roller element 2 is formed with minute recesses arranged in random directions. Such roughness should be arranged so that the ratio RMS(L)/RMS(C) will be not more than 0.8 wherein RMS(L) and RMS(C) are values which represent the surface roughness of the rolling contact surface 2a in the longitudinal direction and circumferential direction, respectively. SK values, which are another parameter of surface roughness, in the axial and circumferential directions should be determined to be not more than −2.0.

The roller contact surface having such a roughness as defined above can be formed by special barrelling.

The SK values represent the skewness of the curve showing the distribution of the surface roughness. If the roughness distribution forms a symmetrical curve as with a Gauss distribution curve, the SK value will be zero. It has been discovered that an oil film layer can be more easily formed if the SK values for both the longitudinal and circumferential directions are not more than −2.0.

A plurality of needle bearings having their rolling surfaces finished differently from one another were made and tested for durability when used to support various shafts each having a different surface roughness.

As shown in FIG. 2, the needle bearings tested have an outer diameter Dr of 38 mm and an inner diameter dr of 28 mm and each includes a cage 5 having a length L of 13 mm and fourteen rolling elements having a diameter D of 5 mm.

The bearings to be tested were classified into three groups accordingg to the surface roughness of the roller elements. The surface roughness (expressed in RMS and SK) of the test specimens is shown in Table 1 and the machining method for the roller elements for every group is shown in Table 2.

TABLE 1

| Bearing | Kind of working | RMS ($\infty$m) Longitudinal (L) | RMS ($\infty$m) Circumferential (C) | L/C | SK Longitudinal | SK Circumferential |
|---|---|---|---|---|---|---|
| Test bearing A | A | 0.055 | 0.052 | 1.06 | −1.15 | 1.23 |
| Test bearing B | B | 0.040 | 0.044 | 0.91 | −0.44 | −0.33 |

TABLE 1-continued

| Bearing | Kind of working | RMS (μm) | | | SK | |
|---|---|---|---|---|---|---|
| | | Longitudinal (L) | Circumferential (C) | L/C | Longitudinal | Circumferential |
| Test bearing C | C | 0.100 | 0.134 | 0.75 | −2.06 | −2.17 |

TABLE 2

| Kind of working | Working history |
|---|---|
| A | Grinding → super finish I |
| B | Grinding → super finish II |
| C | Roller of this invention special working by barreling |

Figure 3C:
Figure 3E:
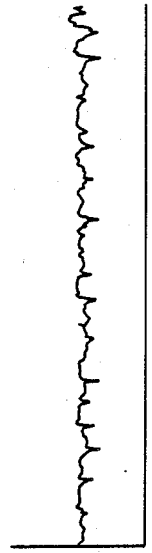
Figure 3B:
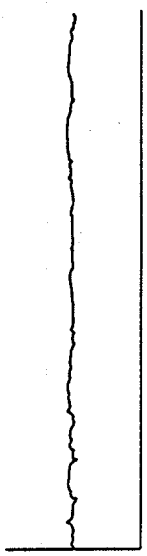
Figure 3D:
Figure 3F:

FIGS. 3A to 3C show the surface conditions of the roller elements in each specimen.

FIG. 4 schematicaly shows a radial load tester 11 used in this test. The bearings 1 to be tested were mounted on both sides of a rotary shaft 12 and rotated under loaded conditions.

Figure 5:
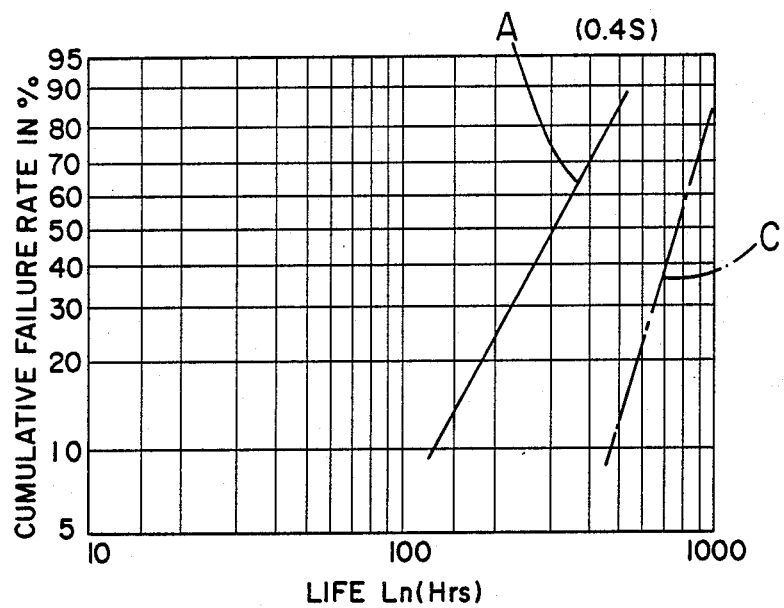
FIGS. 5 to 7 are graphs showing the results of the life test of the roller elements.
Figure 6:
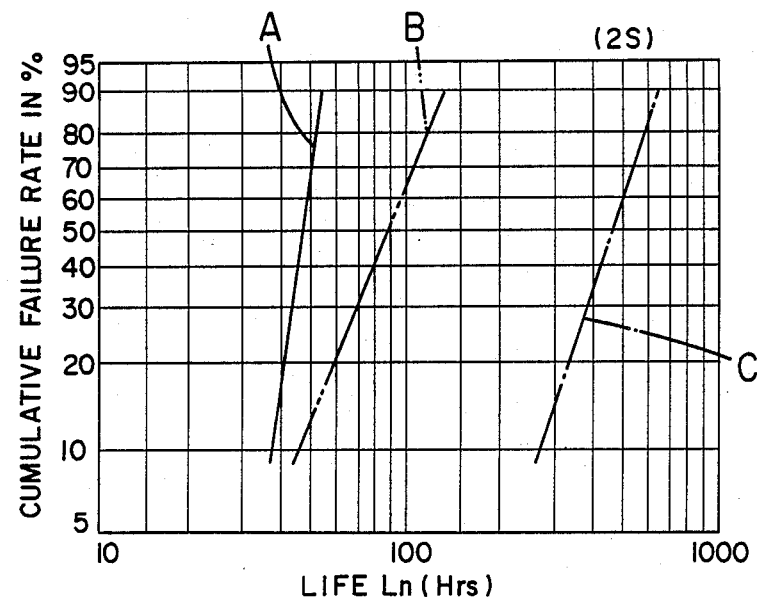
Figure 7:
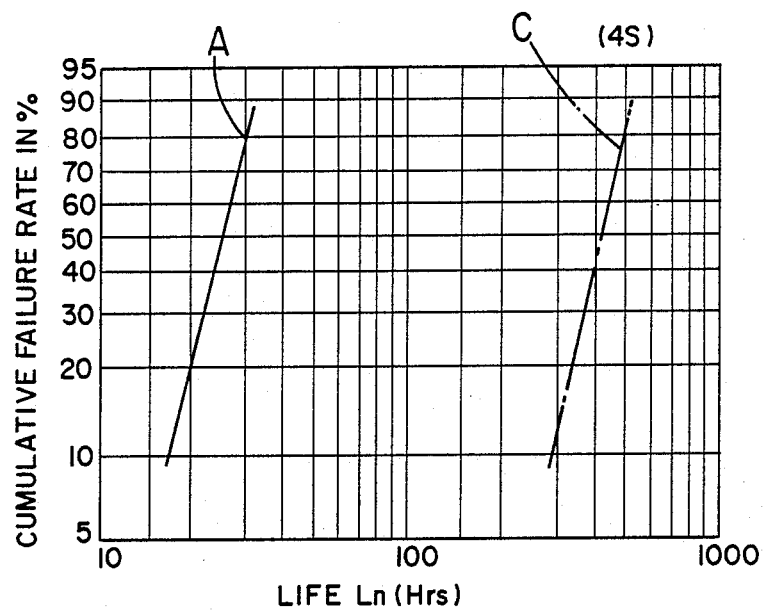

The inner races (or mating shafts) used in the test have their raceway ground so that their roughness Rmax will be 0.4–4 microns (The roughness is expressed in S in FIGS. 5 to 7). The outer race of every test bearing has a surface roughness Rmax of 1.6 microns.

Other testing conditions were as follows:

| Radial load on bearing | 1465 kgf |
|---|---|
| Number of revolutions | 3050 rpm |
| Lubricant | turbine oil (10 cst under test conditions) |

The results of the life test are shown in FIGS. 5 to 7, in which "cumulative failure rate" is the failure rate of the roller elements tested. For example a failure rate of 10 percent means that 10% of the roller elements have failed, while the other 90% not.

As will be apparent from the results, the test bearing C according to the present invention exhibited a long life irrespective of the roughness (0.4, 2 or 4 microns) of the mating shaft surface. It showed an especially long life when the mating shaft has a surface roughness Rmax of 2 or 4 microns.

No peeling was observed on the surface of the test bearing C. Such peeling is often observed with rolling between a rough surface and a finished surface.

Table 3 shows oil film parameter Λ which represents the conditions of oil film formed on the roller elements and which were calculated by use of the Grubin formula, i.e.

$$\Lambda = \frac{h_0}{\sqrt{\sigma_1^2 + \sigma_2^2}}$$

wherein Λ is the oil film parameter value, $\sigma_1$ and $\sigma_2$ are RMS values and $\zeta_o$ is the thickness of the oil film layer.

TABLE 3

| Roller | Surface roughness of mating shaft | | |
|---|---|---|---|
| | 4 μm | 2 μm | 0.4 μm |
| Test bearing A | 0.78 | 1.27 | 2.03 |
| Test bearing B | 0.78 | 1.30 | 2.17 |
| Test bearing C | 0.67 | 0.91 | 1.10 |

The results show that the value Λ for each rolling element is greatly influenced by the surface roughness of the mating shaft. If the surface roughness Rmax of the mating shaft is 2 microns, the value Λ will be 0.91–1.30.

Figure 8:
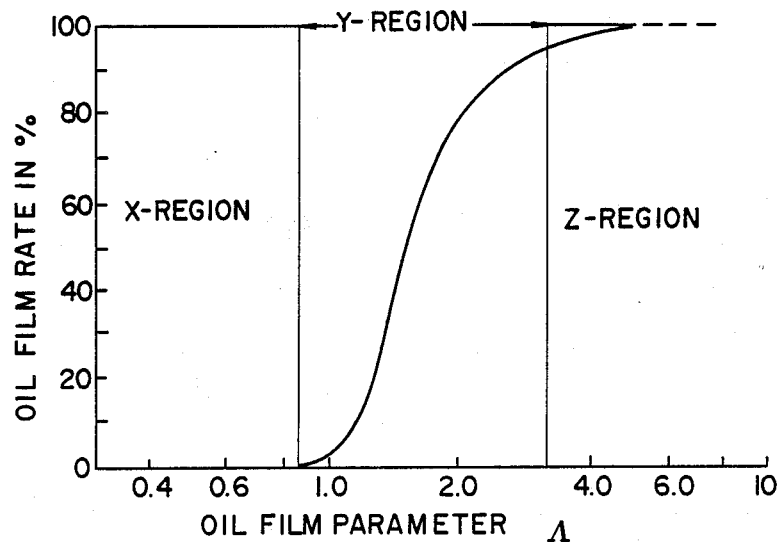
FIG. 8 is a graph showing the relationship between the oil film parameter and the oil film ratio.

FIG. 8 roughly shows the relationship between the value Λ and the ratio of the oil film layer formed on the roller element. It has been believed, as is also apparent from this graph, that the value Λ, the larger the oil film ratio. But the test results suggest that the value is not the only factor that determines the oil film ratio.

In FIG. 8, X-region is the region where surface damage occurs; Y-region is the one where the bearing is ordinarily used; and Z-region is the one where the life tends to increase.

Test conditions

Maximum contact surface pressure: 227 kgf/mm$^2$
Peripheral speed: 4.2 m/sec (2,000 rpm)
Lubricant: Turbine oil (10 cst under test conditions)
Number of repeated loads: $4.8 \times 10^5$ (in 4 hours).

Figure 9:
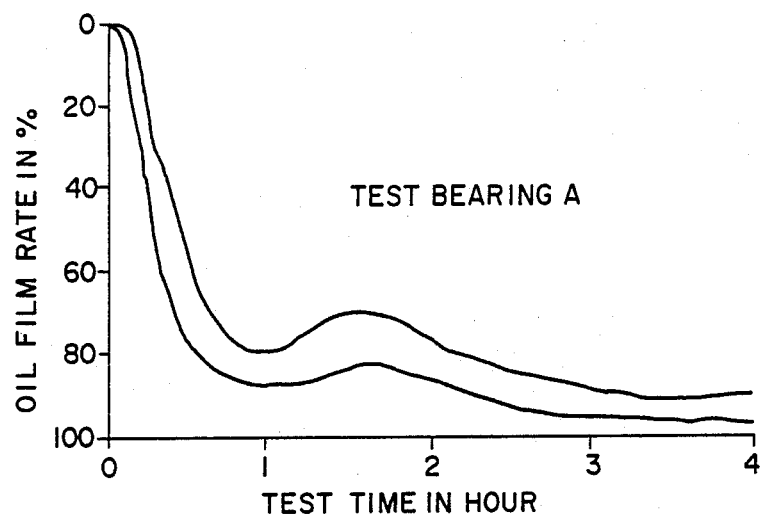
FIGS. 9 and 10 are graphs showing the oil film ratio.
Figure 10:
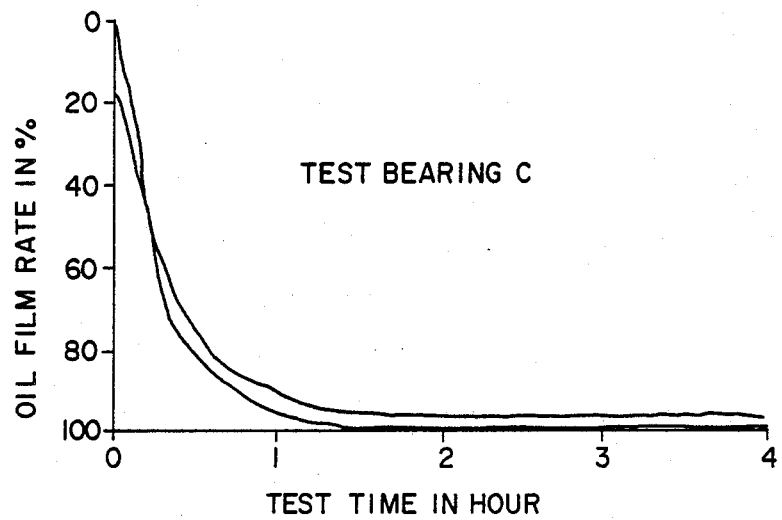

FIGS. 9 and 10 show the results of measurement of the oil film ratio. The results show that with the test bearing C according to the present invention, the ratio at the beginning of operation increased about 20 percent in comparison with the test bearing A.

It was also observed that a substantially flawless oil film was formed when the number of repeated loading reached $1.2 \times 10^5$.

Further, no damage was observed on the finished surface of the roller elements of the test bearing C according to the present invention, whereas a number of peelings about 0.1 mm long were observed on that of the roller elements of the test bearing A.

Figure 11:
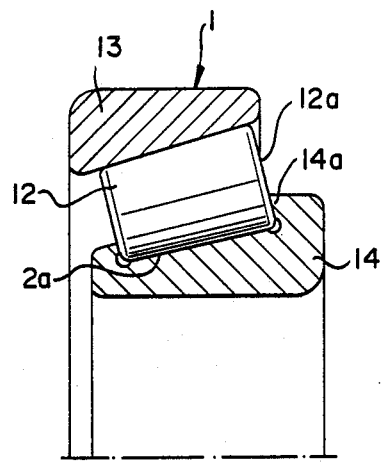
FIG. 11 is a sectional view of a tapered roller bearing as the second example of a roller bearing.

FIG. 11 shows the second example of a roller bearing in which the bearing 1 is in the form of a tapered rolling bearing and has tapered roller elements 12 rotatably mounted between its outer ring 13 and inner ring 14.

Each roller element 12 has its roller surface 2a roughened finely in random directions in the same manner as the roller element 2. The outer ring 13 and the inner ring 14 have their rolling contact surfaces finished by standard grinding.

The tapered roller bearing in the second example having roller elements formed with a fine and random rough surface (which corresponds to the test bearing C) and a tapered roller bearing having roller elements formed with a roller surface finished by standard grinding (which corresponds to the test bearing A) were prepared to check the state of oil films on the roller elements. These test bearings were put to an acceleration peeling test by use of a 2-cylinder tester in the same manner as for the first example.

The test results in this example were the same as shown in FIGS. 9 and 10. Peelings developed in the same manner as in the first example.

Figure 12:
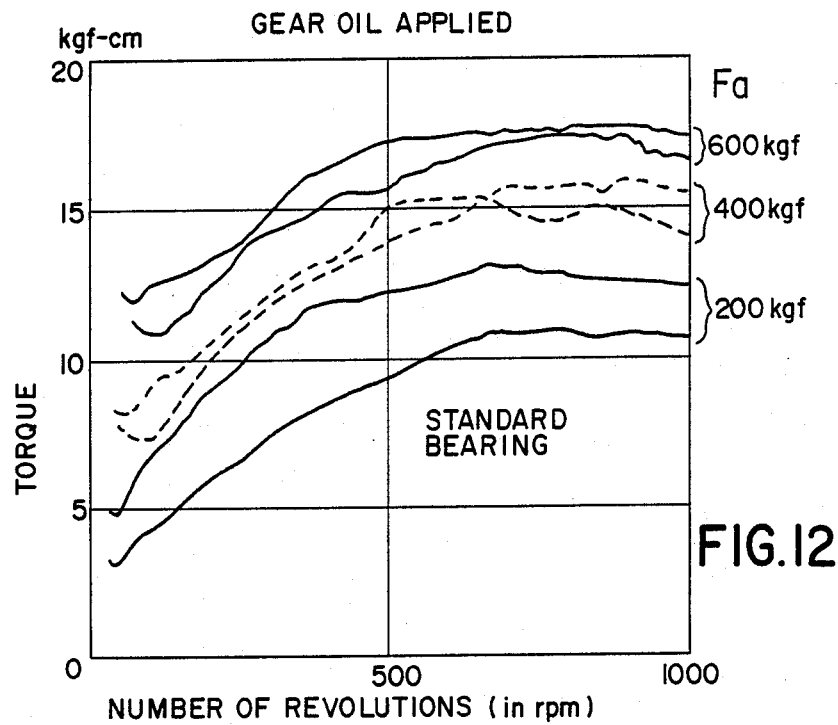
FIGS. 12 and 13 are graphs showing the results of measurement of the torque values of a prior art tapered roller bearing and one according to the present invention.
Figure 13:
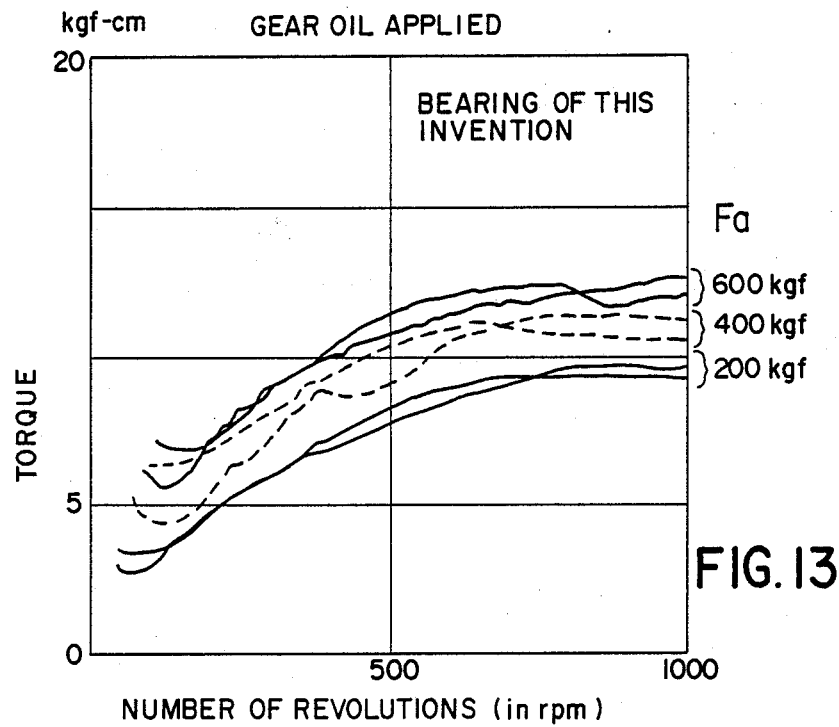

FIGS. 12 and 13 show the results of measurement of the torque acting on the test bearings A and C.

Each tapered roller element 12 of the test bearing C according to the present invention has the whole outer surface including a large-diameter end face 12a in contact with a shoulder 14a of the inner ring 14, finely and randomly roughened.

As will be apparent from FIGS. 12 and 13, the torque acting on the tapered roller bearing according to the present invention is about 30 percent lower than with a conventional standard bearing. The torque is especially low when used at a low speed and under a heavy load where an oil film is difficult to form.

Figure 14:
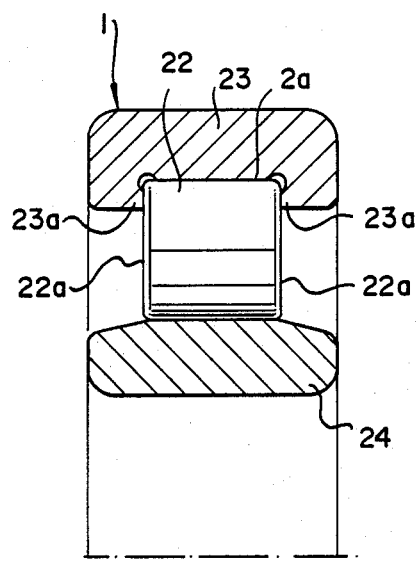
FIG. 14 is a sectional view of a cylindrical roller bearing as the third example of a roller bearing.

FIG. 14 shows the third example of a roller bearing wherein the bearing 1 is in the form of a cylindrical roller bearing and has cylindrical roller elements 22 having their roller surface 2a finely roughened in random directions. Its outer ring 23 and inner ring 24 have their roller surfaces finished by standard grinding.

Each cylindrical roller element 22 in the cylindrical roller bearing in this example has its both end faces 22a in contact with shoulders 23a formed on the outer ring 23 as well as its roller surface 2a, finely roughened in random directions. The test results were the same as those of the second example.

What is claimed is:

1. A roller element for use in a roller bearing, said roller element having a surface extending in longitudinal and circumferential directions and formed with a multiplicity of minute recesses arranged in random directions on said surface so that the ratio RMS(L)/RMS(C) is not more than 0.8 wherein RMS(L) is the surface roughness mean square value in the longitudinal direction of said surface and RMS(C) is the surface roughness mean square value in the circumferential direction of the surface and so that the SK value is not more than $-2.0$ in both the longitudinal and circumferential directions of said surface wherein the SK value represents skewness that indicates a distribution curve of surface roughness of said longitudinal and circumferential surface.

* * * * *